US009348119B2

(12) United States Patent
Thomson (10) Patent No.: US 9,348,119 B2
(45) Date of Patent: May 24, 2016

(54) IMAGING SYSTEMS (75) Inventor: Peter K. Thomson, Victoria (AU)

(73) Assignee: Yepp Australia Pty Ltd., Toorak, Victoria (AU)

( * ) Notice: Subject to any disclaimer, the term of this patent is extended or adjusted under 35 U.S.C. 154(b) by 513 days.

(21) Appl. No.: 13/122,495

(22) PCT Filed: Oct. 2, 2009

(86) PCT No.: PCT/AU2009/001310
§ 371 (c)(1),
(2), (4) Date: Jul. 18, 2011

(87) PCT Pub. No.: WO2010/037176
PCT Pub. Date: Apr. 8, 2010

(65) Prior Publication Data
US 2012/0019661 A1    Jan. 26, 2012

(30) Foreign Application Priority Data

Oct. 2, 2008  (AU) ................. 2008905127

(51) Int. Cl.
H04N 7/18      (2006.01)
G02B 13/06     (2006.01)
A63B 24/00     (2006.01)
A63B 69/08     (2006.01)
(Continued)

(52) U.S. Cl.
CPC ............ *G02B 13/06* (2013.01); *A63B 24/0003* (2013.01); *A63B 69/08* (2013.01); *G03B 17/02* (2013.01); *G03B 37/04* (2013.01); *A63B 2071/0647* (2013.01); *A63B 2220/05* (2013.01); *A63B 2220/806* (2013.01); *A63B 2220/807* (2013.01)

(58) Field of Classification Search
CPC ......... H04N 5/225; H04N 7/18; H04N 5/232; H04N 5/76; H04N 9/74; H04N 7/228; H04N 7/118; B60L 1/14
USPC ............... 348/157, E07.085, E07.078, 14.02, 348/207.99, 211.11, 231.3, 584; 440/2, 440/105; 704/E21.001; 345/156
See application file for complete search history.

(56) References Cited

U.S. PATENT DOCUMENTS 4,500,203 A    2/1985  Bieringer
5,920,338 A *  7/1999  Katz ................... G07G 3/00
                                                  348/150

(Continued)

FOREIGN PATENT DOCUMENTS

JP       10-023363       1/1998
WO    WO2005/072464      8/2005

OTHER PUBLICATIONS

"CCD Black and White Video Camera Module" Technical Manual; A-BAD-100-11, © 2002 Sony.*

(Continued)

*Primary Examiner* — Chikaodili E Anyikire
*Assistant Examiner* — Dramos I Kalapodas
(74) *Attorney, Agent, or Firm* — Ryan Kromholz & Manion, S.C.

(57) ABSTRACT

An imaging system comprising one or more imaging devices wherein each device comprises a lens or lenses which together form an array of lens wherein the array includes two lenses; the two lenses face in opposing directions; the axes of the two lenses are substantially parallel; and the system is adapted to simultaneously capture and record images from the two lenses.

17 Claims, 12 Drawing Sheets (51) Int. Cl.
    *G03B 17/02* (2006.01)
    *G03B 37/04* (2006.01)
    *H04N 5/225* (2006.01)
    *A63B 71/06* (2006.01)

(56) References Cited

U.S. PATENT DOCUMENTS

| | | | | |
|---|---|---|---|---|
| 6,545,705 | B1* | 4/2003 | Sigel et al. | 348/157 |
| 7,046,273 | B2* | 5/2006 | Suzuki | 348/157 |
| 7,217,164 | B2* | 5/2007 | Short | 440/2 |
| 7,217,464 | B2 | 5/2007 | Takanashi et al. | |
| 7,301,528 | B2* | 11/2007 | Marvit et al. | 345/156 |
| 7,872,670 | B2* | 1/2011 | Kikuchi | H04N 5/23212 348/157 |
| 7,907,297 | B2* | 3/2011 | Mikuni et al. | 358/1.15 |
| 8,004,555 | B2* | 8/2011 | Oswald | H04N 7/142 348/14.01 |
| 8,077,917 | B2* | 12/2011 | Forsgren | A63B 24/0021 348/157 |
| 8,330,821 | B2* | 12/2012 | Lee | 348/207.99 |
| 8,456,527 | B2* | 6/2013 | Elangovan | G06K 9/6202 348/142 |
| 2003/0147634 | A1* | 8/2003 | Takezawa et al. | 386/117 |
| 2005/0025313 | A1* | 2/2005 | Wachtel | G06T 1/0007 380/54 |
| 2005/0085348 | A1 | 4/2005 | Kiefer et al. | |
| 2006/0074558 | A1* | 4/2006 | Williamson et al. | 701/213 |
| 2006/0139463 | A1* | 6/2006 | Heinonen | H04N 5/2251 348/239 |
| 2006/0206246 | A1* | 9/2006 | Walker | 701/16 |
| 2007/0070204 | A1* | 3/2007 | Mentzer | H04N 5/2251 348/207.99 |
| 2007/0279482 | A1* | 12/2007 | Oswald et al. | 348/14.02 |
| 2008/0125996 | A1* | 5/2008 | Fitzhugh | 702/89 |
| 2008/0246859 | A1* | 10/2008 | Mizutani | H04N 5/23293 348/231.99 |
| 2011/0164105 | A1* | 7/2011 | Lee | H04N 7/142 348/14.02 |

OTHER PUBLICATIONS

"CCD Black and White Video Camera Module" Technical Manual, Sony A-BAD-100-11 © 2002 Sony Corp.*
Sibi product information; retrieved from the internet on Oct. 22, 2009 from http://www.yepp.com.au/title_pages/YePP/YePP_products.aspx.
http://www.yepp.com.au/title_pages/YePP_news_detail/200810w1b/200810w1b.aspx for Sibi launch date, of Oct. 3, 2008.

* cited by examiner

IMAGING SYSTEMS

FIELD OF THE INVENTION

The invention relates to imaging systems and devices for capturing images.

BACKGROUND OF THE INVENTION

An effective rowing stroke is a combination of athleticism, skill and technique. Developing technique takes time and practice. One recognised problem in developing a better technique is the inability of a rower to remotely view their own stroke and identify and observe any inadequacies. This same issue exists for a rowing coach when communicating to the crew subtle observations and the modifications that are required.

The present invention seeks to at least partly mitigate this problem. The systems and devices of this invention may also be useful in other sports and areas, such as forensics.

SUMMARY OF THE INVENTION

According to one aspect of the present invention there is provided an imaging system comprising one or more imaging devices wherein each device comprises a lens or lenses which together form an array of lens wherein:
  the array includes two lenses;
  the two lenses face in opposing directions;
  the axes of the two lenses are substantially parallel; and
  the system is adapted to simultaneously capture and record images from the two lenses.

According to another aspect of the present invention there is provided an imaging device an array of lenses mounted to the device wherein,
  the array includes two lenses;
  the two lenses face in opposing directions;
  the axes of the two lens are substantially parallel; and
  the device is adapted to simultaneously capture images from the two lenses.

According to a still further aspect of the present invention, there is provided a system for capturing images of a rower's stroke while rowing in a rowing apparatus comprising an imaging device, wherein:
  the imaging device is fixed relative to the apparatus; and
  the imaging device is fixed substantially at or above the pivot point of the rower's oar, or in a position simulating the location of the pivot point of a rower's oar, for recording images of the rower and/or the rower's oar.

BRIEF DESCRIPTION OF THE DRAWINGS

In order that the invention may be more easily understood, embodiments will now be described, by way of example only, with reference to the accompanying drawings, in which.

DESCRIPTION OF THE EMBODIMENTS

A first embodiment of the invention is shown in FIGS. 1 to 6. In this embodiment, an imaging device (a camera 2) is specifically adapted for use in coaching sports, particularly rowing.

Figure 1:
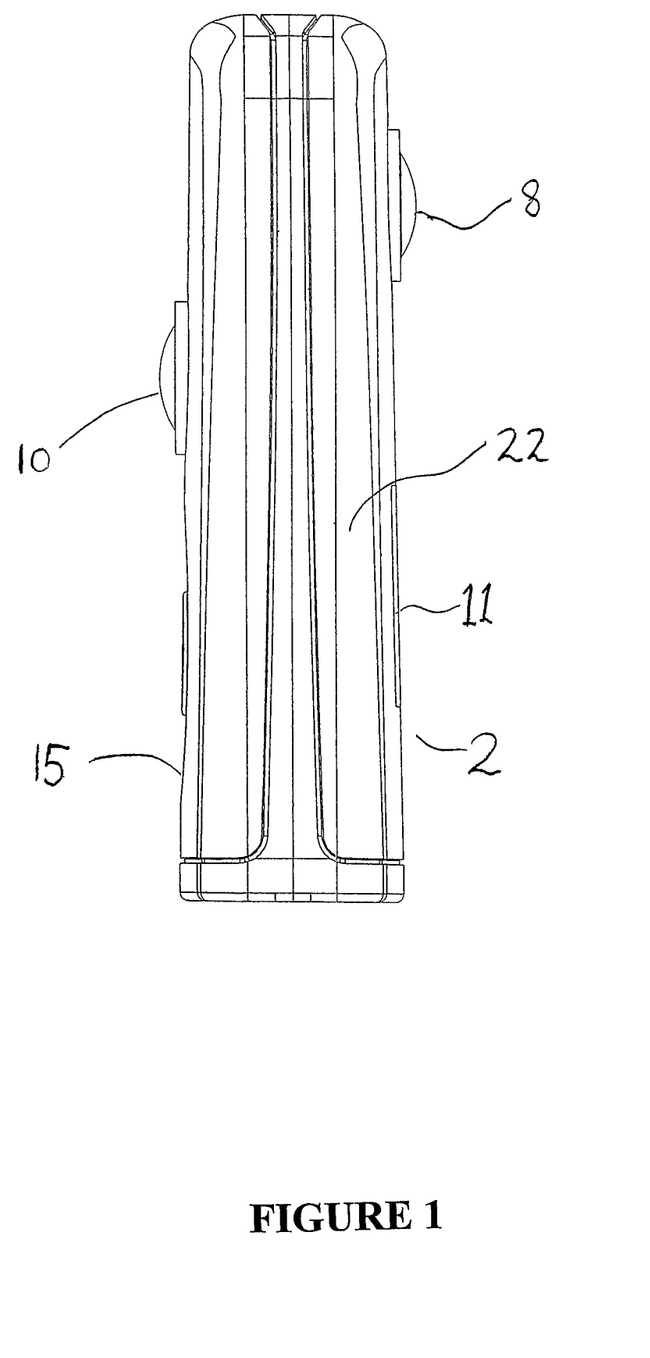
FIG. 1 is a side view of a camera in a first embodiment of the invention.

The camera has two lenses 8, 10 mounted to a single body 22. The two lenses 8, 10 face in opposing directions. Each lens has an axis passing transversely through its centre. The axes of the two lenses are parallel. The device is adapted to simultaneously capture images from both lenses.

In this embodiment both lens are housed in a single device. However, it is understood that each lens could be housed in a separate device. For example, two devices could be mounted back to back with one lens in each device. Such a combination of devices is referred to as a "system" which is adapted to simultaneously capture images from both the first and second lenses even though they are in different devices.

FIG. 1 shows the camera 2 having two lenses which face in opposite directions, fixed to a single camera body 22. One lens is, relative to the boat, an outward facing lens 10 and the other an inward facing lens 8. The camera 2 is able to record and synchronise images from both lenses at the same time. The camera 2 can simultaneously record still or video images in two different directions from the same perspective.

Each lens focuses on an image sensor located inside the camera body 22. The inward facing lens 8 is mounted slightly higher in the body 22 than the outer lens 10. The axes of the two lenses are offset to allow a more compact camera body, and to match the perspective of each image. If they were back to back the body 22 would potentially need to be wider. The two image sensors are coupled to an image processor which receives data from the image sensors and can encode it for storage. The camera incorporates a digital memory for storing the image and video data. A battery mounted inside the body 22 powers the camera, the battery can be recharged using electrical connectors located on the bottom of the camera.

The processor and image sensors are capable of recording video at frame rates in excess of 100 frames/sec from both viewpoints. A wired, or wireless, interface allows data stored in the memory to be transferred to another device, such as a computer, for playback, analysis, or permanent storage.

Figure 2:
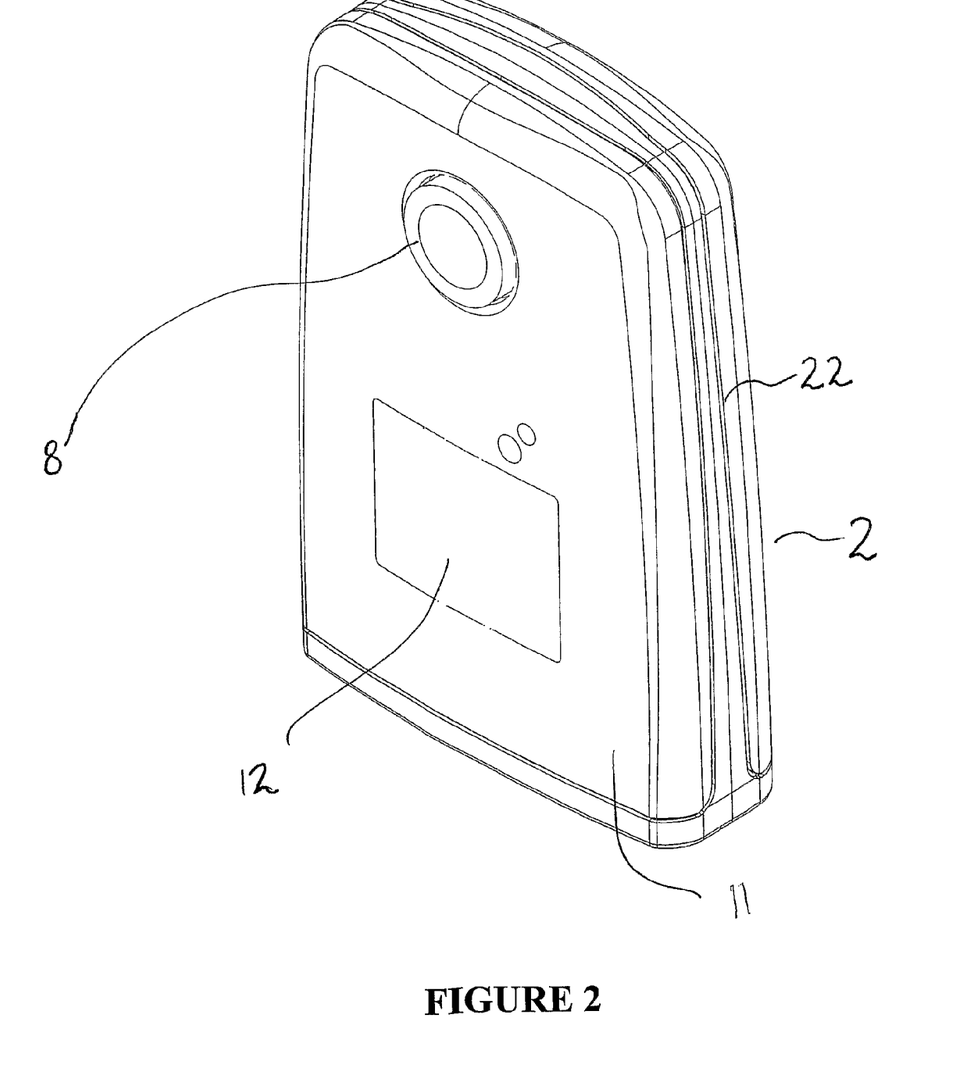
FIG. 2 is a perspective view of an inner face of the camera.

FIG. 2 shows an inner face 11 of the camera 2. The inward facing lens 8 is located on this face. The inner face 11 also includes an display screen 12, which provides the user with a Graphical User Interface (GUI) to the device. The GUI includes a menu structure that allows options, including deleting and transmitting data from the memory of the camera, as well as starting and stopping recording.

Figure 3:
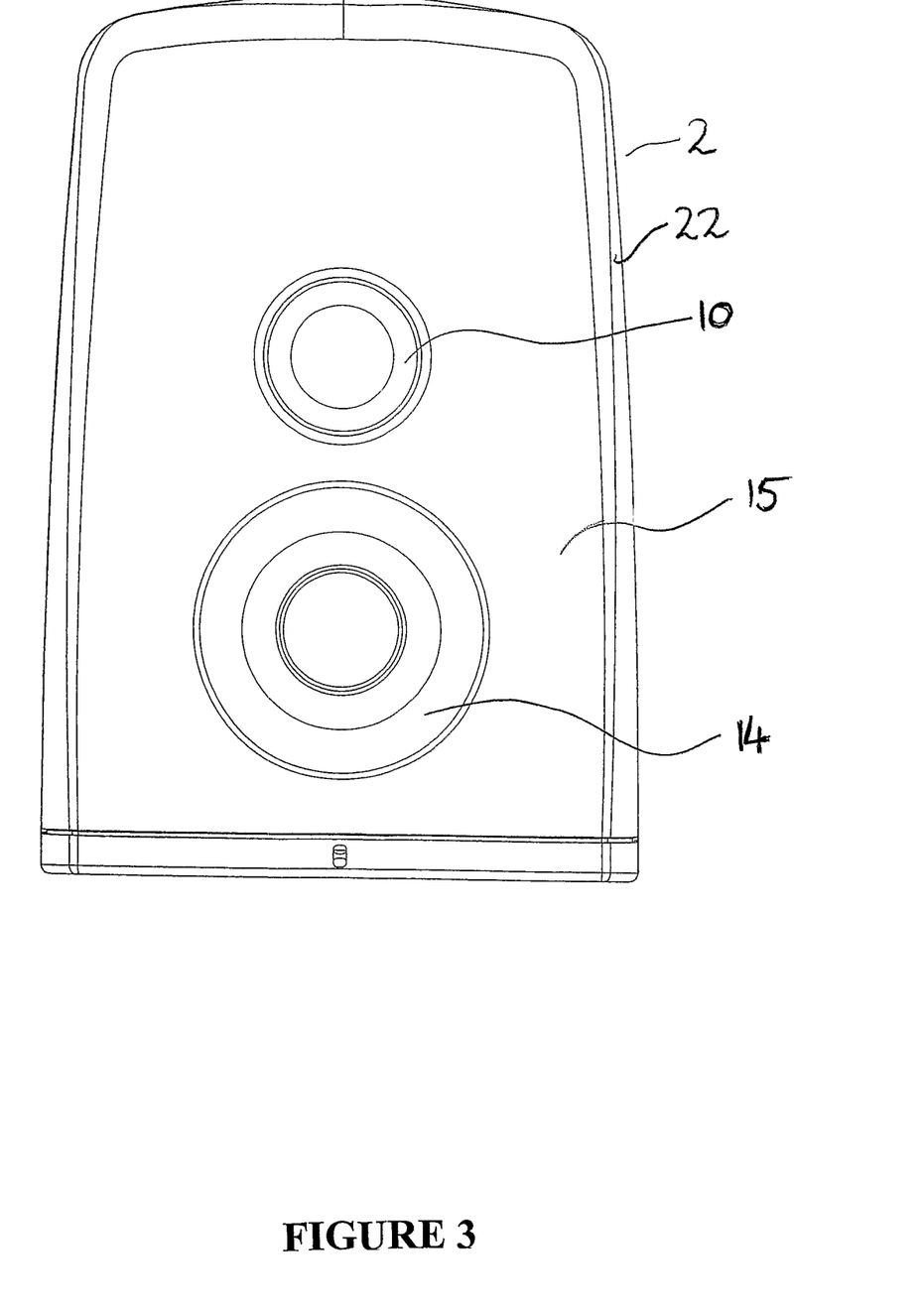
FIG. 3 is a front view of an outer face of the camera.

On the outer face 15, shown in FIG. 3, the camera has a round 'touch' interface 14. The interface can be used to operate the GUI on the display screen 12. Sensors behind the surface of the interface 14 detect the presence of a user's finger on the surface of the interface. The user can move their finger in a rotational pattern around the interface 14 to scroll through and select various options on the GUI.

The camera 2 has a sealed, waterproof body 22 to facilitate operation in exposed and wet environments.

Figure 4:
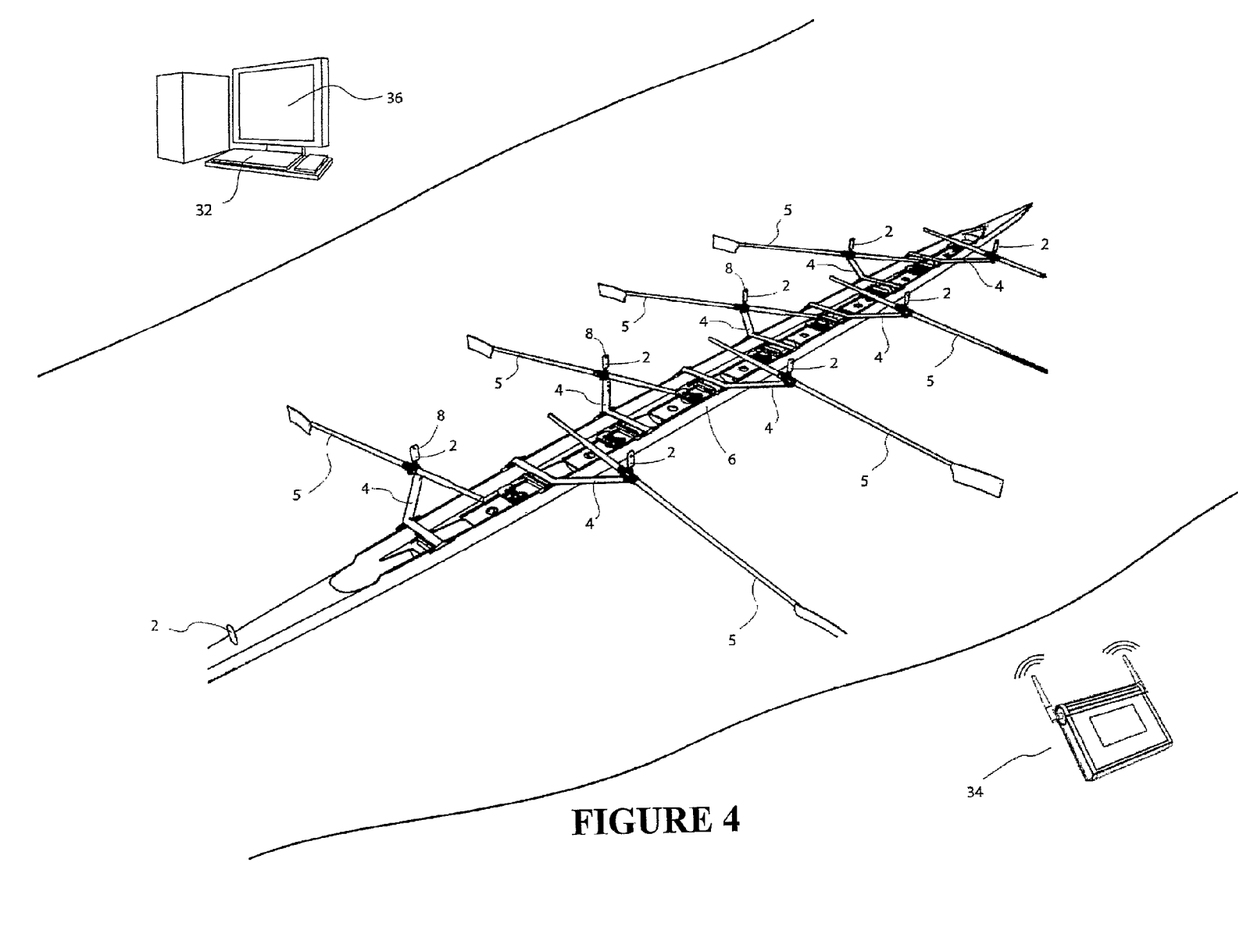
FIG. 4 is a general layout of a system for rowing training including the camera.
Figure 9:
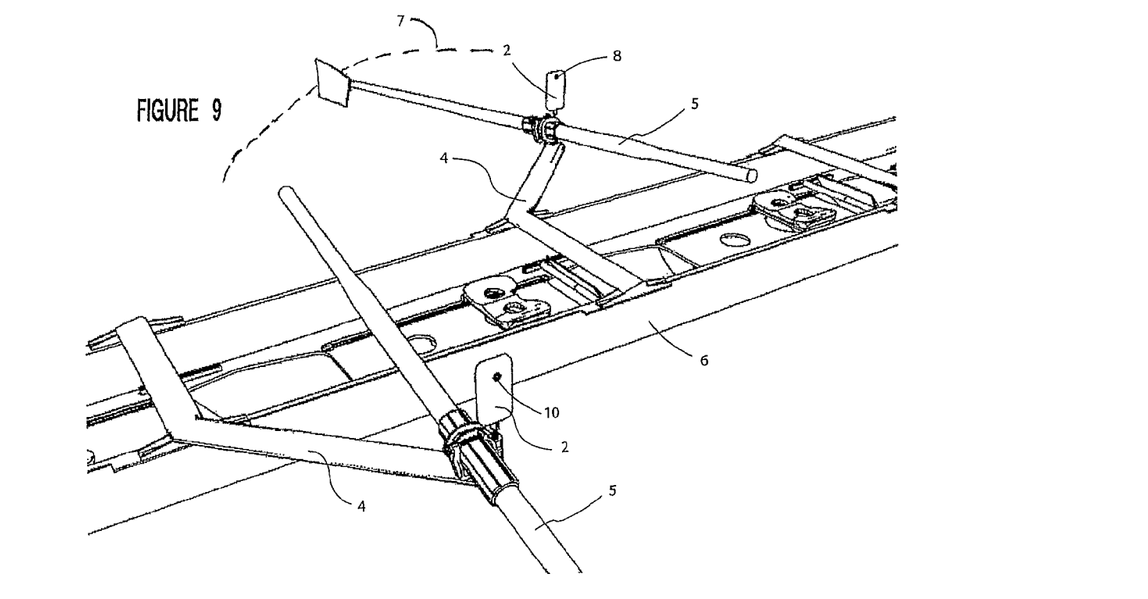
FIG. 9 is a perspective view of part of a rowing boat unoccupied illustrating the mounting of a camera.
Figure 10:
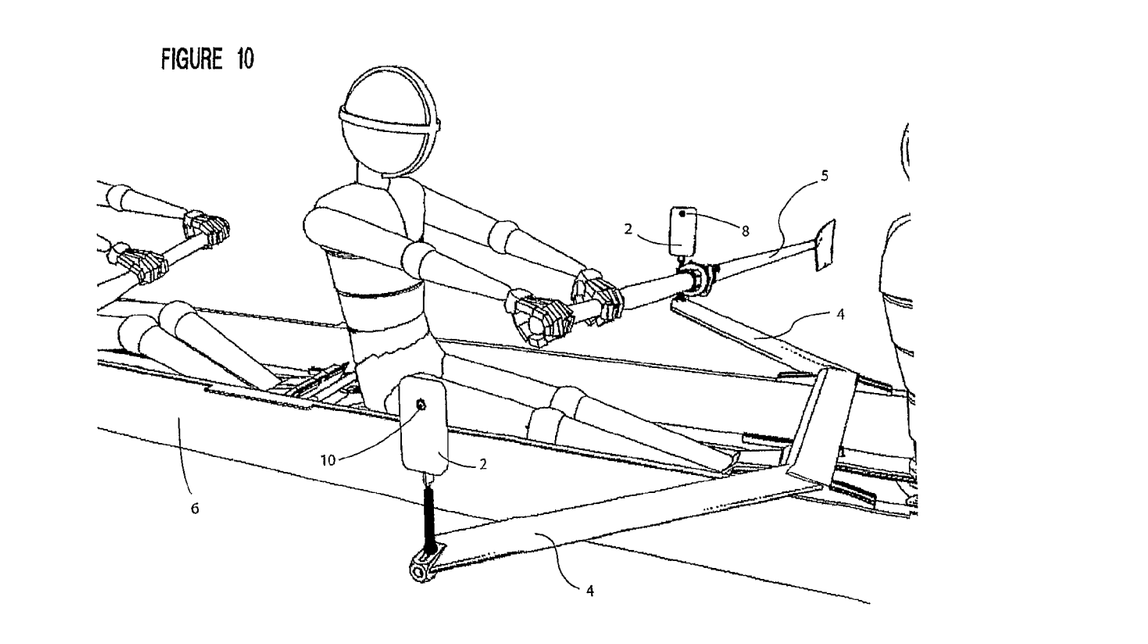
FIG. 10 is a perspective view of part of a rowing boat showing the relationship of a rower with cameras mounted on either side of the rower, FIGS. 11a, b, c show side views of the stroke of a rower, FIGS. 11d, e, f show plan views of the stroke of the rower, FIGS. 12a, b, c show the stroke of the rower as viewed from a camera mounted on the centre line of the boat.

One application of this embodiment is as part of a coaching system which is illustrated in FIG. 4; this application may require the use of several cameras 2. FIG. 9 shows an unoccupied boat 6 with cameras 2 mounted on oars 5 extending from both sides of the boat. FIG. 10 illustrates a boat with a rower and a pair of cameras 2 mounted outboard of each side of the boat with lens facing towards the rower. Both cameras 2 are mounted on the oar rigger 4 to be fixed relative to the boat.

The system is used for capturing images of a rower's stroke while in a rowing boat 6, rowing simulator, rowing device or an exercise machine. The cameras 2 are fixed relative to the rowing apparatus. In the case where the device is mounted on a rowing boat 6, each camera 2 is fixed at the pivot point of each rower's oar 5 for recording a side elevation view of a stroke of the rower and the rower's oar simultaneously.

To obtain the side elevation view of the stroke of the rower and the rower's oar 5, each camera 2 is mounted on the oar's rigger 4 of the rowing boat 6. The cameras are mounted near to the fulcrum of the oar 5. When mounted, the inward facing lens 8 of the camera faces into the boat and can be used to record the rower's rowing action from a side elevation view. The outward facing lens 10 faces toward the oar's movement arc 7, and can be used to record the action of the oar. The cameras 2 are fixed relative to the boat 6 and they do not rotate as the oar moves through its arc and the rower's body rocks back and forth during the stroke.

By recording both the action of the rower and the oar the camera 2 provides an improved visual record of the stroke that could not be achieved with a single lens camera.

Figure 11A:
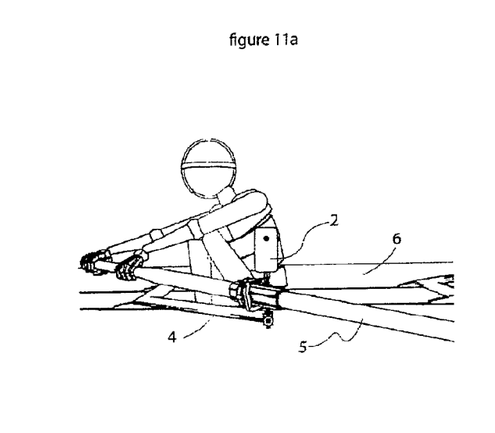
Figure 11B:
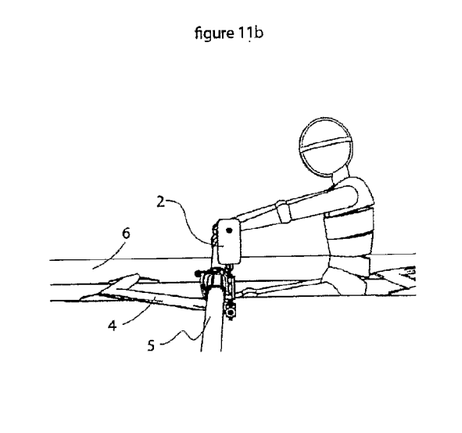

FIGS. 11a, b, c, d, e and f illustrate the stroke of a rower viewed from the side and from above. It should be noted that the camera 2 does not move relative to the boat during the rower's stroke.

From the coach and rower's perspective this record of the stroke plays an important training role. The recording provides an important view of the rowing action which can be used as a basis for further training and improvement.

From the coach's perspective, the camera 2 plays an important role. It can be difficult to describe in words what problems exist in a rower's stoke. The recording provides a basis to clearly identify problems and suggest solutions. Being able to record both the action of the rower and the oar tip in synchronisation is significantly advantageous to the coach. For example, if the tip is clearly leaving the water too late (shown in the recording from the outward facing lens 10) the coach can point specifically to which part of the rower's action (recorded by the inward facing lens 8) is causing this problem.

Figure 5:
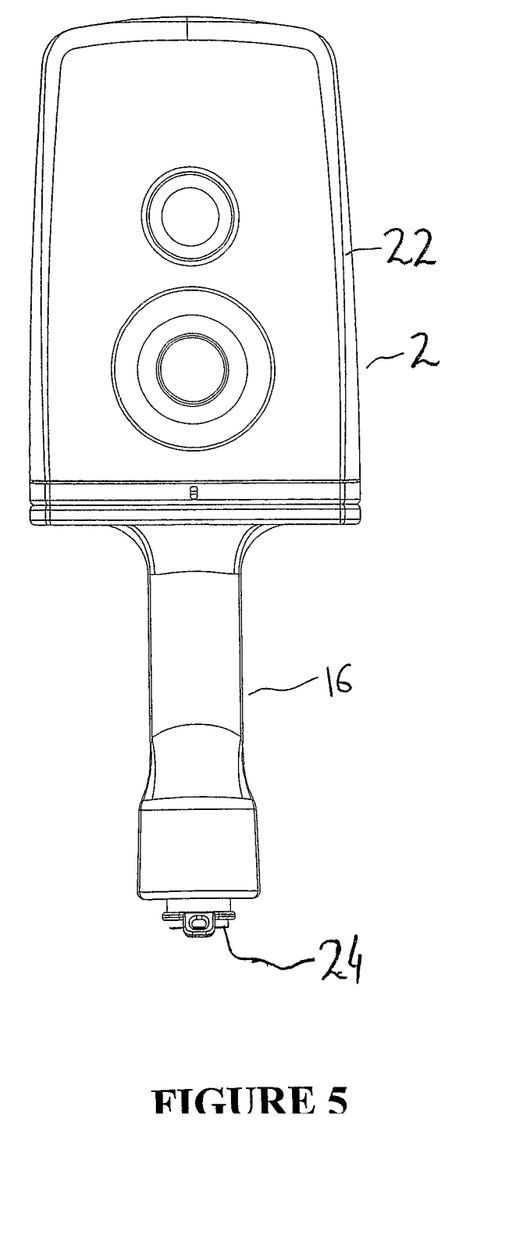
FIG. 5 is a front view of the camera fitted to a mount.
Figure 6:
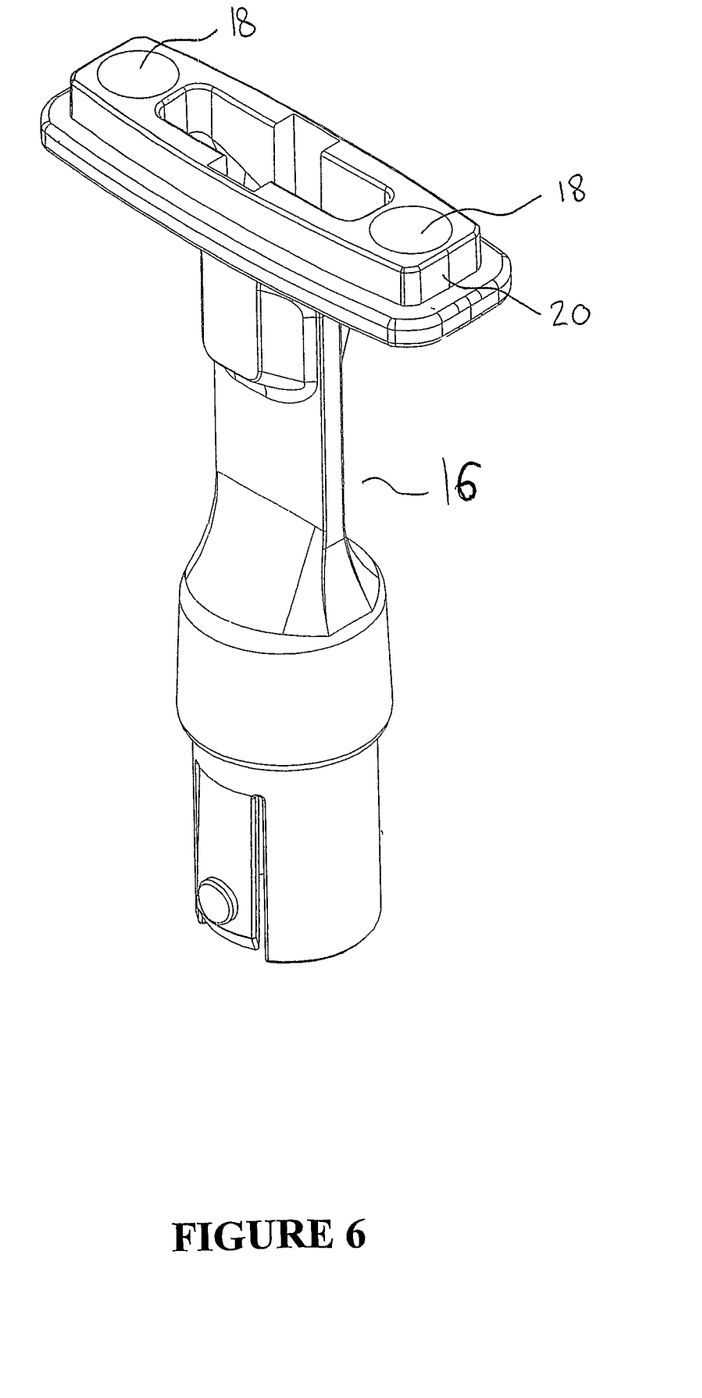
FIG. 6 is a perspective view of the mount for the camera.

FIG. 5 shows the camera 2 fitted onto a mount 16 which can be bolted to the rigger 4 of the boat 6. FIG. 5 shows a perspective view of the mount. The camera locks onto magnets 18 in the mount. Alignment with the mount is achieved by way of a spigot 20 in the mount. The magnets 18, allow the camera to be easily removed from the mount for the purposes of downloading the recorded data, recharging a battery in the camera, and for storage and security.

The mount can be bolted to the rigger 4 using a bolt assembly 24. As the mount is permanently fixed to the rigger 4 the camera will align to the same angle each time it is fitted to the mount 16. Thus, the lens of the camera 2 will capture the same perspective, from the same direction each time the camera is fitted to the mount 16. This will ensure the camera 2 always captures a full view of the rower and oar tip without any adjustment each time it is fitted to the boat 6, and that all future images will be able to be overlayed on previous images for direct comparison.

As shown in FIG. 4, a set of cameras 2 can be mounted on the same boat 6 to record several rowers. The images recorded by each lens are accurately synchronised and time stamped when recorded. The time data used to stamp the image data could be determined in number of ways:

Each camera could include its own clock.

Each camera could include a GPS module and an antenna, and receive accurate time data from a GPS satellite A single clock could transmit accurate time data either wirelessly or over a network of wires to each camera on the boat.

Figure 12A:
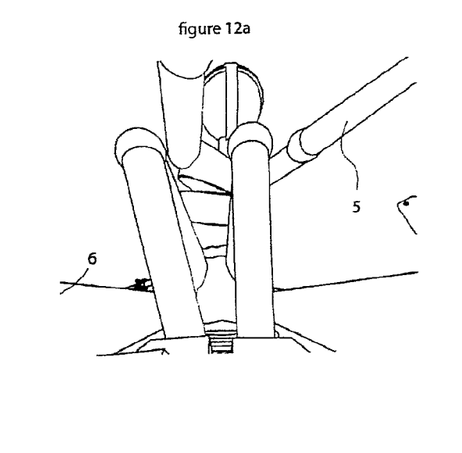
Figure 12B:
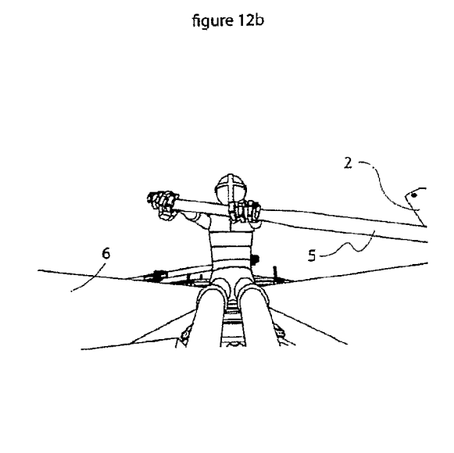
Figure 12C:
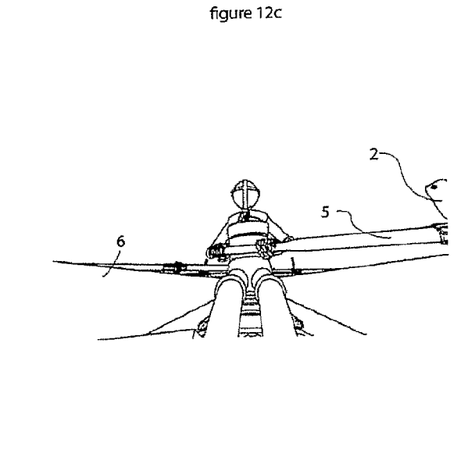
Figure 13:
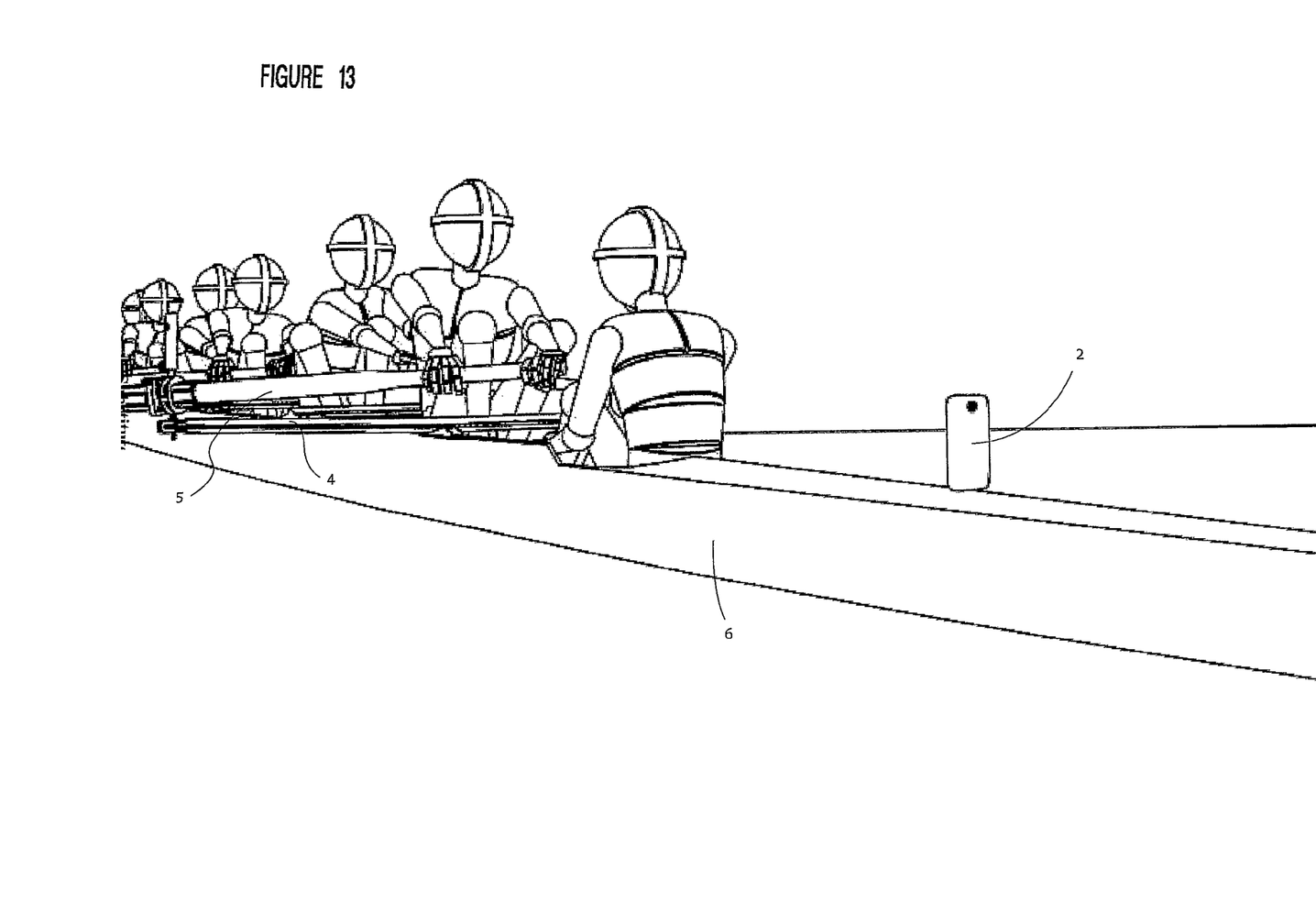
FIG. 13 shows a camera mounted on the centre line of the stern of the boat.

Single or dual lens cameras 2 can be positioned on the centre line of the boat as shown in FIG. 13. It is understood that cameras 2 can be placed on the deck of the vessel between rowers to produce the images of the rower's stroke shown in FIGS. 12a, b and c.

The cameras 2 are adapted to transmit recorded data wirelessly to a computer 32. The data is recorded on the computer for later playback on a monitor 36. Thus, once a training session is complete, playback can be activated without having to remove the cameras 2 from the boat 6 or physically wiring them to the computer 32.

Coordination of the stroke's segment timing and length between different crew members is critical to developing a balanced boat and a successful rowing crew. However, it can be difficult for each crew member to determine if he/she is "in time", particularly while he/she simultaneously concentrates on his/her own rowing stroke.

The various time-stamped recordings can be played back simultaneously to give rowers an accurate perception of their own timing relative to the rest of the crew. For example, the image of each rower's oar tip captured by the outward facing lens 10 could be played back in various viewing panes on the monitor 36 to demonstrate any timing issues.

Alternatively, the various images could be superimposed on each other 36 to more fully demonstrate timing problems. The recordings from the inward facing lens 8 (the recording of the rower's action) can also be superimposed or compared in separate frames on the monitor 36. When superimposing the images the oars or rowers could be shaded in different colours to demarcate each rower in the team. Thus, any rowers who were not in sync with the rest of the team can be easily identified.

The high frame capture rate allows the coach or rower to play back the recording at slow speeds and accurately determine the timing of each part of the rowing action.

Figure 11C:
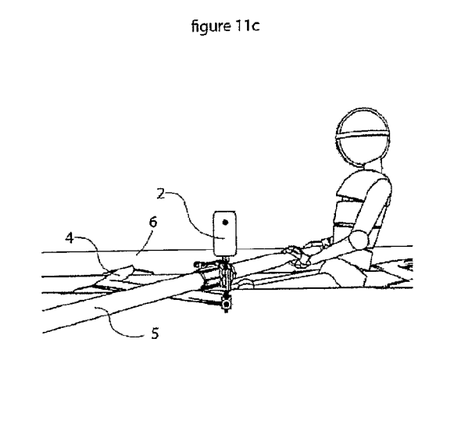
Figure 11D:
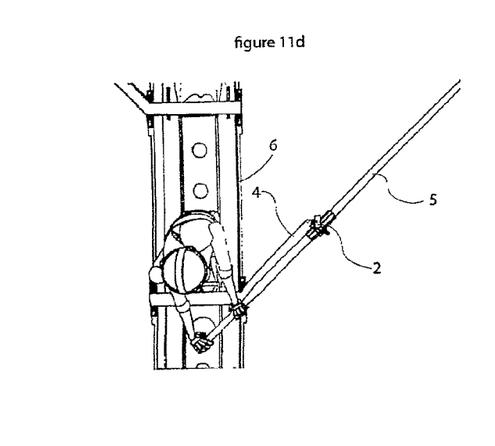
Figure 11E:
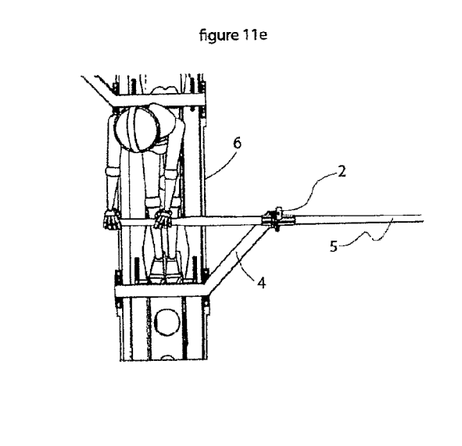
Figure 11F:
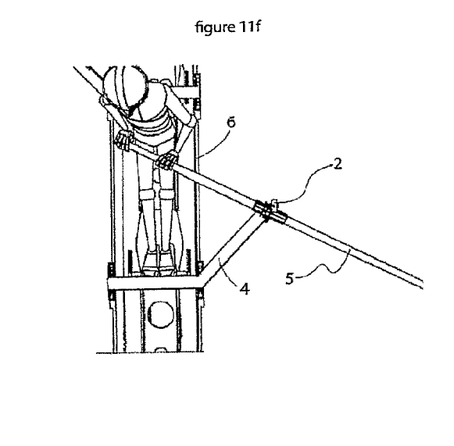

The cameras are mounted so as to capture the full range of the rowing stroke, from the 'catch' position shown in FIGS. 11a and 11d to the 'finish' position shown in FIGS. 11c and 11f. FIGS. 12a, b and c show three still frames from the video as it appears in a piece of software which forms part of the training system, along with the cameras.

The software allows a user to mark on screen the various 'points' of the stoke at various times. For example, the user could mark the point at which the oar enters the water at the start of the drive. The user could then mark the point at which the oar leaves the water at the finish of the drive. By marking these two points at least two calculations can be made:

The 'drive' time, by establishing the time elapsed between the frames.

The 'drive' angle; that is the angle swept by the oar during the drive.

It is understood that, by marking various points on the video frames, a wide variety of data could be established, for example, to determine if a rower is improving or if rowers are in time with one another. The following could be calculated:

the swept angle 'lost' at each end of the stroke;
the travel of the seat during each stroke;
the angle formed between the rowers upper and lower leg at the catch position.

It is understood that the above measurements and many others could assist a coach in selecting and training rowers. They would also be useful to the rower in monitoring and understanding his/her own stroke. The camera is fixed relative to the boat such that calculations can be easily performed by marking points on the frames of the video.

The software may include the capability to automatically recognise and measure the various parts of the stroke without the user having to mark the various points.

The rower may wear highlighted tabs on their clothing. These tabs could be reflective, or simply be coloured to contrast with the rower's clothing. Such tabs will assist the user to mark the required points on the frames so as to assess the stroke. The tabs could also assist the software in recognising and automatically marking these same points on the stroke.

This embodiment includes a recording device (not shown) located within the boat. This device includes a multi axis gyroscope and an 3D accelerometer. The gyroscope measures the roll, pitch and yaw of the boat about its primary longitudinal axis. The accelerometer measures the boat acceleration.

This embodiment also includes a remote control 34, which can be used by the coach. The control 34 can be used to start and stop recording by the various cameras 2, and to re-configure the cameras parameters. The remote control allows the coach to capture particular strokes or parts of session they feel need review during the debriefing session. The camera devices contain a circular memory which provides the user with the ability to post-trigger the capture point of a particular event after it has occurred.

The cameras 2 can also be used in conjunction with a load or strain gauge 38 which is also mounted to the rigger 4. The gauge measures the amount of force applied by the oar 7 to the rigger 4. The gauge 38 thus monitors each stroke's force profile. The gauge 38 is in wired or wireless communication with the camera 2. The data from the gauge 38 is transferred to the camera where it is stored in the memory alongside each image frame of the rowing strokes. Thus, during playback and debriefing the coach and rower have access to this data as well as the images. This data can be displayed visually on the monitor 36 alongside the stroke recording to assist in critiquing and providing the rower with feedback on their technique. For example, the force measured on the strain gauge 38 can be shown on a graph alongside the video of the rower or the oar.

As discussed above, the system could include two separate imaging devices mounted back to back, one monitoring the oar, the other the rower. However, it is expedient that a single device can record images in both directions.

The same cameras 2 can also be fixed to rowing training machine, or other rowing apparatus, to record the stroke of a rower during training. Where the machine is a flywheel type machine, there is no oar, and a single lens could be used to record only the rower.

Figure 7:
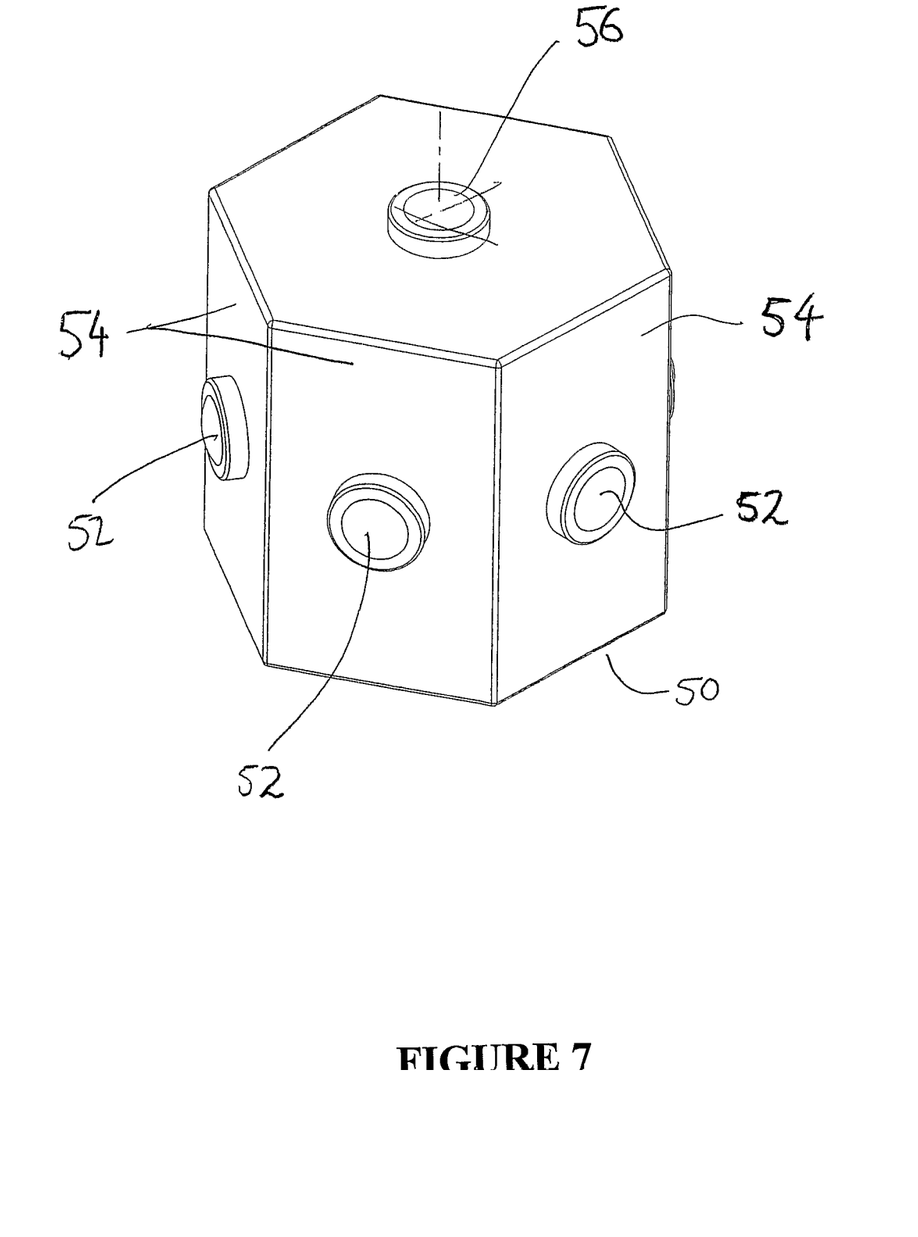
FIG. 7 is a perspective view of a camera in accordance with a second embodiment of the invention.
Figure 8:
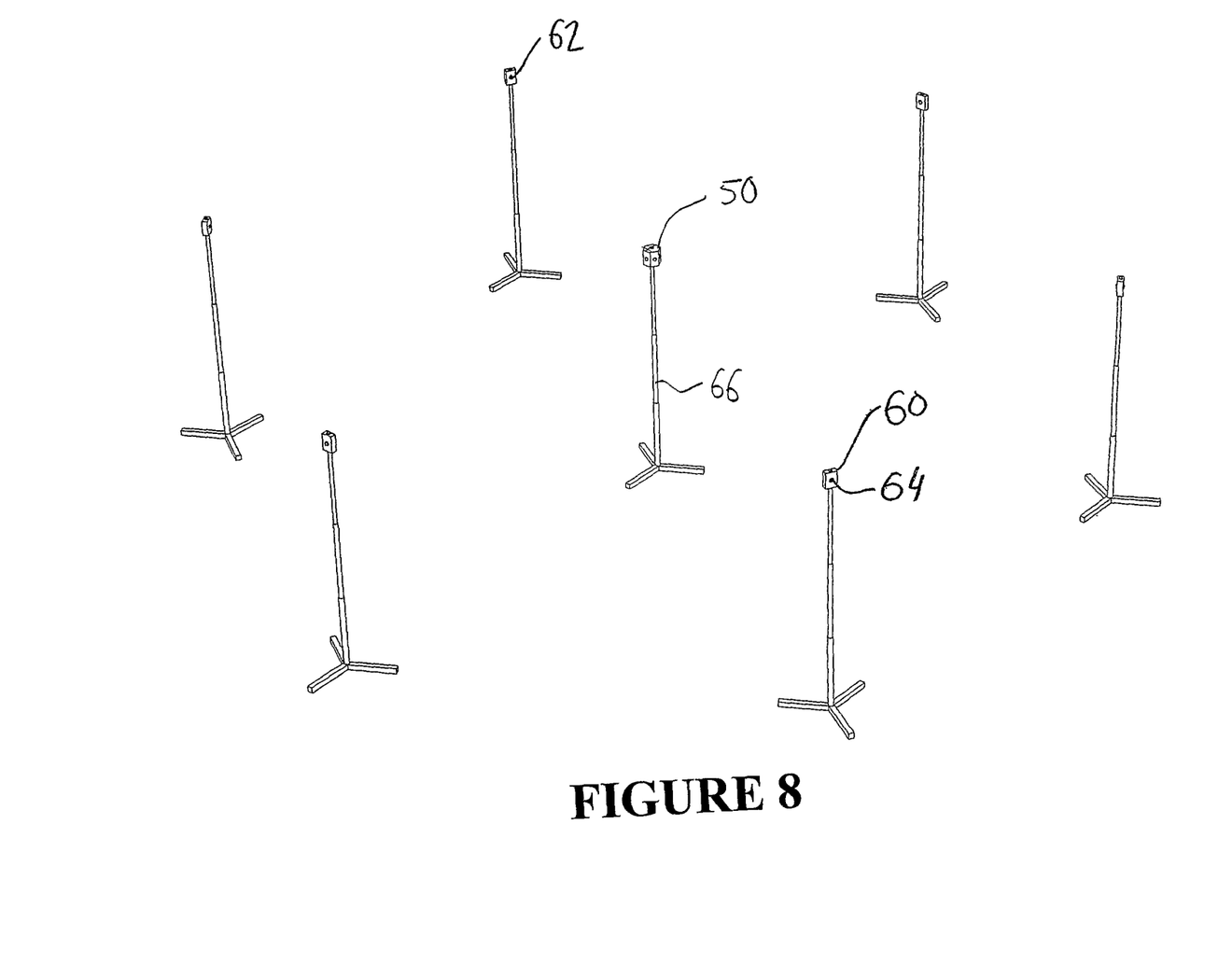
FIG. 8 is a general layout of cameras in the second embodiment of the invention.

A second embodiment of the invention is shown in FIGS. 7 and 8. In this embodiment, a hexagonal camera 50 is specifically adapted for use in forensic applications. The camera can be used to capture a still or video record of a crime scene.

The hexagonal camera 50 has a total of seven lenses each capable of recording images at different angles from substantially the same perspective. Six side lenses 52 are located on the side walls 54 of the camera. A top lens 56 faces upwards.

The side lenses 52 are made up of three pairs of opposing lenses, which not only have parallel axes, but by virtue of the fact that they are directly opposite each other, share the same axis.

A problem which can arise in photographing a crime scene is that the photographer will subjectively capture images they perceive to be important at the time. However, as the investigation proceeds a record of any number of other perspectives or angles of the scene may become vital to determining what happened at the scene.

This embodiment provides means for simultaneously recording an array of different perspectives and angles quickly and without the subjective bias of a photographer. The hexagonal camera 50 (an imaging device) can be set up to gather a breadth of visual data before evidence begins to degrade.

As in the first embodiment the camera comprises a image sensor located behind each lens, as well as a processor and digital memory. Images can be recorded simultaneously from all image sensors. Each image is recorded with two pieces of data, the time it was taken and the location from which it was taken.

FIG. 8 shows one application of this hexagonal camera 50. In this application the hexagonal camera 50 is used in combination with six dual lens cameras 60 which are also used to record images at a crime scene. The dual lens cameras 60 have an inward facing lens 62 and an outward facing lens 64. Each camera is mounted on a telescopic stand 66 to enable, if desired, matching of their image planes.

The hexagonal camera 50 is placed in a central location at the scene and uses various lenses to record in multiple different directions (including upwards) at one time. The dual lens cameras 60 are placed in a ring around the camera 50. The inward facing lenses 62 of each dual lens camera 60 are directed toward the hexagonal camera 50. The outward facing lens 64 record images radially outward from the circle.

This embodiment provides an extensive visual record of a crime scene. Importantly, images are taken without a subjective bias. No particular perspective or angle is given precedence over another. If desired, the various images can be used to reconstruct a multi-dimensional model of the scene during the investigation that follows.

Importantly, the recordings are time stamped. Thus, the investigator can easily ascertain what was occurring in two or more parts of the crime scene at the same time.

The hexagonal camera 50 can also be used in a dynamic rather than static fashion. For example, a user can hold the hexagonal camera 50 in their hand and walk in a circle, circumnavigating the scene. The multiple lenses 52 and 56 can thus capture images both toward the centre of the circle and also outwards from the circle. Such extensive visual information provides a useful record of the scene.

The images captured by this camera provide a rich pool of data from the array of lenses. The value of this data is increased by having a fixed relationship between the opposing lens pairs. One can view an image from a first lens in a pair and compare or contrast it with an image taken in an opposite direction at the same time, and from the same perspective.

Throughout this specification, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It will be understood to persons skilled in the art of the invention that many modifications may be made without departing from the spirit and scope of the invention.

The invention claimed is:

1. A system for capturing images of a rower and a rower's oar tip while rowing in a rowing apparatus, the system comprising:
   at least two imaging devices, wherein each imaging device comprises:
      an array of lenses mounted onto a single waterproof body;
      a mount having a first end attachable to the rowing apparatus and configured to position and retain the imaging device at the same angle each time the imaging device is mounted to the rowing apparatus;
      wherein the array includes first and second lenses having substantially parallel axes;
      the first and second lenses face in opposing directions, whereby the field of view of the first lens in the array does not overlap with the field of view of the second lens;
      wherein each one of the first and second lenses is associated with an image sensor and the image sensors associated with the first and second lenses are coupled to an image processor, such that the imaging device is configured to simultaneously capture an image of the rower via the first lens and an opposing image of the rower's oar tip via the second lens when the rower is rowing in the rowing apparatus; and
      an image processor and a digital memory for determining, receiving, and storing accurate time data for each one of the image of the rower and the opposing image of the rower's oar tip by using either a GPS satellite or a wireless transmission of time data from a single clock, such that each one of the images of the rower and the opposing image of the rower's oar tip is time stamped with the accurate time data, and the accurate time data can be used as the basis for synchronization of the image of the rower and the opposing image of the rower's oar tip; and
   wherein the imaging devices are synchronised by using the accurate time data.

2. A system according to claim 1,
   wherein the first and second lenses of each imaging device share the same axis.

3. A system according to claim 1 wherein at least one of the single bodies supports a third lens and a fourth lens the third and fourth lenses face in opposing directions;
   the axes of the third and fourth lenses are substantially parallel; and
   the imaging device associated with the at least one single body is adapted to simultaneously capture and record images from all four lenses.

4. A system according to claim 3 wherein the field of view of the third lens in the array does not overlap with the field of view of the fourth lens in the array.

5. A system according to claim 1 wherein a wired or wireless interface facilitates transfer of the data.

6. A system according to claim 1 wherein at least one of the devices includes at least one of a display screen and a graphical user interface.

7. A system according to claim 6 wherein at least one of the devices includes at least one of a touch and a scroll interface.

8. A system according to claim 1 wherein the imaging devices can simultaneously record images in two different directions.

9. A system according to claim 1 wherein the image processor and imaging sensor are capable of recording images at high frame capture rates.

10. A system according to claim 9 wherein the high frame capture rate exceeds 100 frames/sec.

11. A system in accordance with claim 1, wherein at least one of the imaging devices is fixed substantially at or above a pivot point of the rower's oar or in a position at or above a position simulating the location of the pivot point of a rower's oar for recording side elevational view images of the rower and the rower's oar.

12. A system in accordance with claim 11 wherein at least one other imaging device is positioned on the rowing apparatus and is synchronised with the at least one imaging device mounted at or above the pivot point of the rower's oar or on point simulating the rower's oar.

13. A system in accordance with claim 11 wherein at least one single lens camera is positioned on a centre line of the rowing apparatus and is synchronised with the at least one imaging device mounted at or above the pivot point of the rower's oar or on the point simulating the rower's oar.

14. A system in accordance with claim 1, including highlighted tabs for wear by the rower to provide a marking point on the image of the rower.

15. A system according to claim 1 wherein at least one of the mounts includes an assembly to fix the mount to a rigger of the rowing apparatus, and magnets for locking the body onto the mount.

16. An imaging device according to claim 1, wherein each mount has a second end that is removably attached to the respective waterproof body.

17. A method of coaching the stroke of a rower when seated in a rowing apparatus comprising an oar terminating in a tip, the oar pivotally mounted on an out rigger projecting from the rowing apparatus, the method comprising the steps of:
   fixing a waterproof imaging device via a mount at or near the pivot point of the rower's oar to be stationary relative to the oar;
   capturing an image of the rower from a first lens of the imaging device and simultaneously capturing an opposing image of the rower's oar tip from a second lens of the imaging device that faces in an opposing direction to the first lens;
   determining, receiving and storing accurate time data for each one the image of the rower and the opposing image of the rower's oar tip by using either a GPS satellite of a wireless transmission of time data from a single clock; and
   stamping each image with the accurate time data to synchronise the image of the rower and the opposing image of the rower's oar tip.

* * * * *